United States Patent [19]

Laimer et al.

[11] 4,106,113
[45] Aug. 8, 1978

[54] FEEDING SCREW ASSEMBLY OF A MOLDING MACHINE FOR PLASTICIZING MASSES, PARTICULARLY, FOR PLASTICS OR RUBBER

[75] Inventors: Friedrich Laimer, Reichenburg; Bernhard Roth, Mollis, both of Switzerland

[73] Assignee: Netstal-Maschinen AG, Switzerland

[21] Appl. No.: 739,003

[22] Filed: Nov. 4, 1976

[30] Foreign Application Priority Data

Nov. 5, 1975 [CH] Switzerland ..................... 14336/75

[51] Int. Cl.$^2$ ........................... A21C 1/06; B29B 1/10; B29H 1/10
[52] U.S. Cl. ........................................ 366/79; 425/207
[58] Field of Search ............................... 259/191–193, 259/97, 9, 10, 25, 26, 45, 46, 4 AB, 4 AC; 198/658; 425/207, 208, 202, 204

[56] References Cited

U.S. PATENT DOCUMENTS

2,653,351  9/1953  Henning ............................... 425/204
3,746,318  7/1973  Schippers ........................... 259/4 AB Primary Examiner—Harvey C. Hornsby
Assistant Examiner—Timothy F. Simone
Attorney, Agent, or Firm—McGlew and Tuttle

[57] ABSTRACT

A feeding screw assembly of a molding machine for plasticizable masses, particularly, plastics and rubber, comprises a passage part of the screw which has a passage therethrough having mixing means therein for intermixing a plasticizable material which passes through the passage. The material is diverted into the mixing passage which extends completely through the length of the mixing part by communicating passages located upstream for the inflow of the material and downstream for the discharge of the material after it is mixed. The construction may also include a passage portion which comprises an annular displaceable part having an end or side bounding a communicating passage upstream and which will move in a direction to close off this passage after a part of the other material has been fed into the mixing passage.

5 Claims, 4 Drawing Figures

FEEDING SCREW ASSEMBLY OF A MOLDING MACHINE FOR PLASTICIZING MASSES, PARTICULARLY, FOR PLASTICS OR RUBBER

FIELD AND BACKGROUND OF THE INVENTION

This invention relates in general to the construction of plasticizing devices and, in particular, to a new and useful screw assembly of a molding machine for plasticizable masses, particularly, for plastics or rubber, which includes a passage portion of the screw which has a bore therethrough defining a mixing passage with mixing elements therein for effecting the static intermixing of the material as it passes therethrough, and which is included as a portion of the screw in such a manner that a communicating passage from the periphery of the screw upstream feeds the material into the passage, and a communicating passage downstream permits the discharge of the material after it is mixed.

DESCRIPTION OF THE PRIOR ART

Frequently, the masses treated in plasticizing machines are only plasticized during their advance through the screw, or they are provided with coloring matter or other additives just prior to being supplied to the screw. In most cases, the feeding action of the screw is insufficient to effect a satisfactory mixing or homogenization of the mass, for example, as to the temperature distribution, degree of melting, and substance dispersion. It is known, for example, in injection machines for plastics, to effecf the melting of the plastic to be molded in a plasticating unit which substantially comprises a cylinder and a screw received therein. During the so-called metering phase, the screw feeds the mass by rotation into the cylinder volume located in front thereof, namely, the so-called anteroom, of the screw. Simultaneously, the screw is displaced to the rear by the material fed so that the anteroom continuously increases in accordance with the volume of the material fed therein. The heat necessary for melting the mass is produced by heating the cylinder and also by the friction in the mass itself. As soon as the volume of the mass, necessary for the molded part, is plasticized, the so-termed injection phase is started. In this phase, the screw moves axially forwardly and pushes the plastic mass from the anteroom or front portion into the cavity of the mold. A return flow of the mass is usually prevented by a so-called non-return lock. It is also possible, however, to effect the injection without a non-return lock. As is well known, while using a conventional plasticating unit of the above described type, a satisfactory mixing cannot be obtained. The result is a non-homogeneous distribution of the temperature and of the colorants and additives. Thus, with a conventional plasticizing unit, for example, it is not possible to produce high quality molded parts with a perfect color distribution by supplying a liquid coloring matter to a granulated plastic of natural color. Even with a dry or master-batch coloring, defects in the coloring quality are obtained which, with thin-walled molded parts, make the addition of coloring matter in the plasticating unit impossible.

To improve the mixing effect, shearing and mixing devices have been provided which are mounted on the periphery of the screw. Such devices have a particular disadvantage in the occurrence of frictional heat which may result in a damaging of the thermally sensitive masses. A further disadvantage is the complicated shape and increased overall length of the screw. Experience has also shown that the cleaning of such mixing devices, for color change, leaves large amounts of waste plastic and even requires a dismounting of the screw. In addition, applications have been found requiring an even better homogenization of the plastic mass than can be obtained with shearing elements mounted on the outside. This applies particularly to the coloring of thin-walled molded parts and the coloring with liquid coloring matters.

A further attempt to obtain a better mixing is a mixer head, such as described, for example, in U.S. Pat. No. 3,785,620. The mixer head comprises so-called static mixing elements. The distinguishing feature of these elements is that they work without moving parts and divide the mass flowing there through into layers which become displaced relative to one another by the shape of the mixing elements in a manner such that a mixing effect is obtained. These known mixer heads are secured to the injection end of the heating cylinder so that, during the injection operation, the plasticized mass flows first through the static mixing elements and then into the mold cavity. In this arrangement, the mixer head must mix a large volume in a short time. As a result, such mixing devices require large cross-sections in order to minimize the additional pressure drop in the mixing elements which unfavorably affect the injection performance of the machine. The disadvantage thereof is that the overall length is also increased because the ratio of length to diameter is determining for the mixing effect of the static mixing elements. The large mixing volume extends the period of dwell of the plastic in the zone of high temperature which leads to damage of the thermally sensitive masses.

Another disadvantage of the known mixer heads is that they must be equipped with a heating and a corresponding control device. Hitherto also, it has not been possible to use controlled closing nozzles in connection with the known mixing devices, which closing nozzles have to prevent the escape of mass from the plasticating unit during the metering phase.

Of course, similar problems also arise with injection-molding machines designed with a screw plastification and ram injection, where the screw plasticizes the mass and feeds it into an injection cylinder. At the end of the metering phase, an injecting ram pushes the mass from the injection cylinder into the mold cavity.

Analogous considerations apply to screw extruders, to so-called melt extruders in which the mass is fed to the screw in an already molten state, and to plasticating extruders in which, as in the injection-molding machines, the mass is not plasticized sooner than in the screw cylinder.

SUMMARY OF THE INVENTION

The present invention is directed to a feeding screw assembly of a plasticizing machine, comprising a mixing device which ensures a homogenization of the mass which meets commercial requirements even in difficult cases. For this purpose, in accordance with the invention, a mixing device is provided comprising static mixing elements within a mixing passage in a bore of a mass passage part which is supported by a screw.

The mass passage part may form a part of the screw itself, or it may be a part inserted into the screw or attached to the front end thereof, and it is provided with a bore or hollow space accommodating the mixing elements. Communicating passages both upstream as well as downstream are provided for the inflow and outflow of the material to the mass passage part hollow portion or bore.

Due to the inventive design, the passageway in which the mixing elements are disposed is not limited by the cylinder wall and the mass flowing through the passage part is mixed only by splitting it up into partial streams and reuniting the streams into a single stream, but not by a stirring or shearing effect between the cylinder wall and the mixing elements. The rotary motion of the passage part facilitates the splitting of the mass into partial streams insofar as, for example, laminar non-homogeneities become subdivided at the entrance of the passage part. A heat transfer from the mass to non-heated cylinder portions is impossible so that an additional heating provided, for example, in the known, firmly mounted, mixer heads and having to compensate such heat transfer, are also unnecessary. On the other hand, a local overheating of the mass through friction on fixed parts is also made impossible. Since, in an injection-molding machine, during the metering phase, the mass flows through the inventive mixing device, always relatively low throughput rates are obtained, as compared to the known firmly mounted mixer heads and, consequently, relatively long periods of dwell of the mass in the mixing device are available for the mixing and homogenizing process. This makes large mixing cross-sections and overall lengths of the mixing device unnecessary.

Accordingly, it is an object of the invention to provide an improved feeding screw assembly and plasticizer construction, which includes a feed screw having a passage portion intermediate its length with a bore extending therethrough defining a mixing passage having mixing elements therein to cause a diversion and intermixing of the material passed therethrough, and which also have communicating upstream and downstream passages for the inflow and outflow of the material to the mixing passage.

A further object of the invention is to provide a feeding screw assembly of a molding machine for plasticizable masses, particularly, for plastics or rubber which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there are illustrated preferred embodiments of the invention.

DESCRIPTION OF THE PREFERRED EMBODIMENTS

Figure 1:
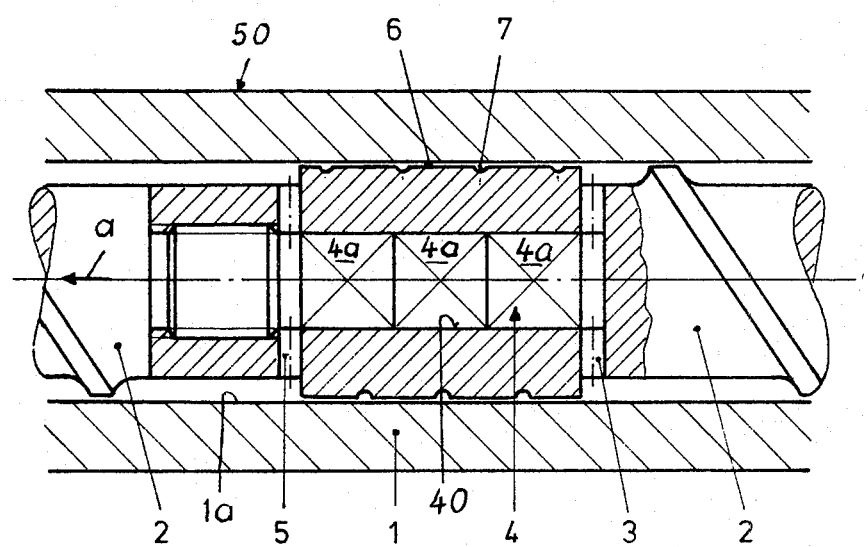
FIG. 1 is a partial axial sectional view of a feeding screw having an intermediate passage portion constructed in accordance with the invention.

Referring to the drawings in particular, the invention embodied therein in FIG. 1, comprises a plasticizer, generally designated 50, which includes a cylinder 1, having a bore therethrough 1a for the feeding of plasticizable masses, and it may be, for example, an injection-molding machine or an extruder. A screw 2 is rotatable in bore 1a for feeding the plasticizable mass in the direction of arrow a.

In accordance with the invention, screw 2 includes a passage part 4, which may be made separately or integral with the screw body and which is arranged coaxially of, and firmly connected to the other screw portions, if made separately. A plurality of such passage parts may be provided if necessary or desirable. In some instances, it is advantageous to have a plurality of passage parts 4 arranged at spaced axial locations along the screw.

The passage part 4 has a periphery which is spaced inwardly from the interior wall of cylinder 1 so as to define a small clearance or play 6 therebetween. In the embodiment shown, the passage part includes an annular helical groove 7. Clearance 6 is intended for sealing passage part 4 against the cylinder wall to an extent such that only a sufficient amount of mass can pass through this gap or clearance which is necessary for a continuous cleaning or scavenging of clearance gap 6 in order to permit a free rotation of passage part 4 and screw 2. Groove 7 facilitates this cleaning process but, in some cases, is omitted.

Passage part 4 has a bore 40 which defines the mixing passage and which extends completely through the part and is provided with a plurality of mixing elements 4a which are not shown in detail, but which provide means for deflecting and diverting the material into a plurality of streams which are intermixed during their movement through the passage of the bore 40.

A communicating upstream passage or passages 3, extend from the periphery of the screw 2 inwardly to passage 1 by the bore 40 for the inflow of the material and a discharge passage downstream 5 permits the outflow of the material from the bore passage 40 to the space around screw 2 at the forward end.

When screw 2 rotates, the mass, which is plasticized, and which is provided with coloring matter or other additives, is passed through passage 3 into the inner space of bore 40 where the mass stream is split by the static mixing elements 4a into a plurality of layers which become mutually displaced due to the shape of the mixing elements and are reunited again. This results in a very satisfactory mixing and homogenization of the mass. The mass flows out through passages 5 and is further advanced by the front portion of the screw 2, either into a metering space for subsequent injection into a mold, for into a space for the direct shaping by an extrusion die.

Figure 2:
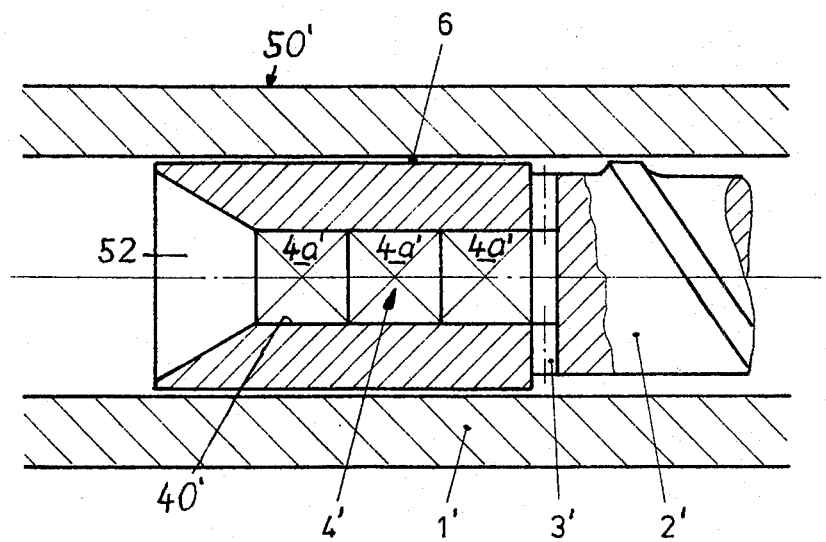
FIGS. 2, 3 and 4 are views, similar to FIG. 1, of different embodiments of the invention.

In the embodiment shown in FIG. 2, a plasticizing device, generally designated 50′, includes a cylinder 1′ having a screw 2′ rotatably positioned therein. In this construction, a passage part 4′ is located at the front end of screw 2′ and it defines a relatively narrow sealing gap 6′ with the interior of the cylinder 1′. A bore 40′ is provided with a plurality of mixing elements 4a′ which provide an intermixing of the material which is passed through an upstream communicating passage or passages 3′ into bore 40′ and exits through an open exit passage 52, defined at the front end of the screw. The material flows directly through the flared outlet portion 52 into the inner space of cylinder 1′ downstream of the screw 2′.

Figure 3:
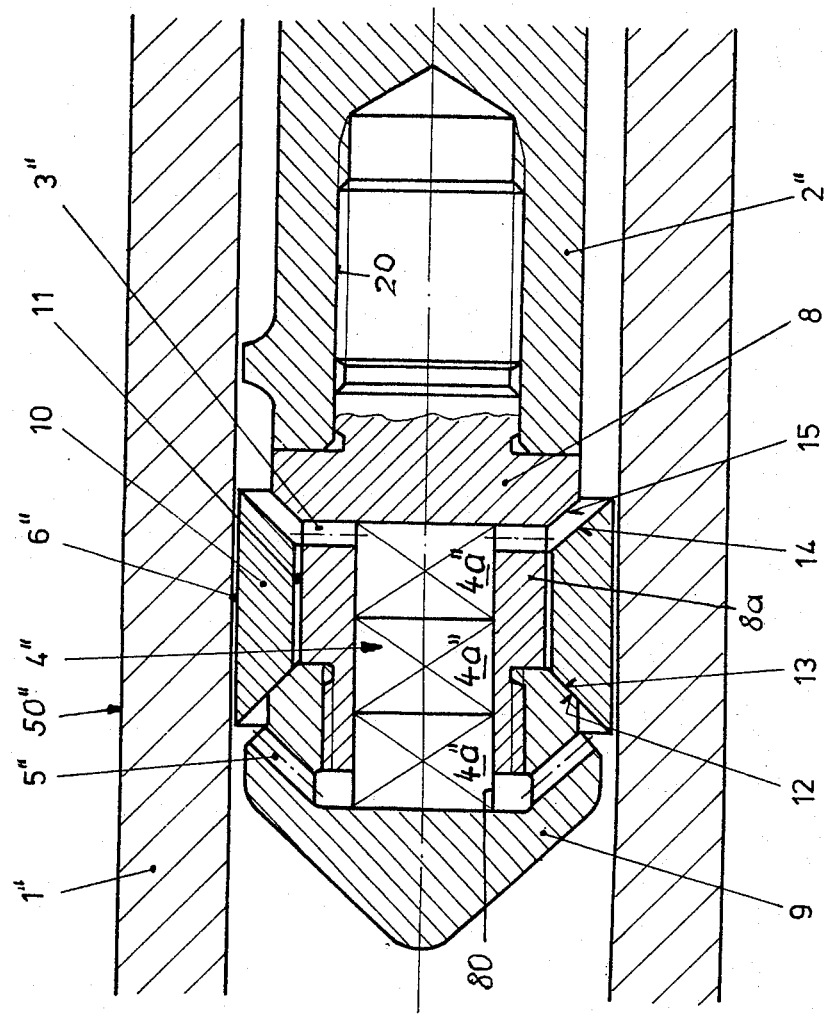

In the embodiment of FIG. 3, a plasticizer, generally designated 50″, includes a cylinder 1″ having a screw 2″ rotatable and axially displaceably movable therein. Plasticizer 50″ is an injection molding machine and, in this embodiment, a mixing part 4" is made up of a plurality of elements, including an inner cylindrical part 8a of a supporting member 8 which is screwed into a threaded receiving socket 20 defined at the front end of the screw 2". Part 8a defines an interior bore 80 having mixing elements 4a" therein, similar to the other embodiments. In addition, a cap 9 is threaded to the end of the screw and a nonreturn lock member 10 comprising an annular part is supported with some clearance or sealing gap 11 around the inner annular part 8a. The cap 9 is provided with an outflow passage 5" for the material which has been mixed, and an inflow passage 3" is defined both in the inner annular member 8a and also in the space between supporting member 8 and the nonreturn lock member or sleeve 10. The mass is directed by the mixers 4a" so as to avoid dead spaces and thereby prevent deterioration of the mass through thermal influence.

The nonreturn lock member defines a clearance 6" with the interior wall of the cylinder 1". An additional sealing effect can be obtained as surfaces 12 and 13 abut against each other during the initial feeding operation. FIG. 3 shows the nonreturn lock 10 in an open position in which it bears against cap 9. During the injection, the nonreturn lock is displaced rearwardly so that a sealing is effected between the surfaces 14 and 15 which butt against each other to prevent a reverse flow of the mass.

Figure 4:
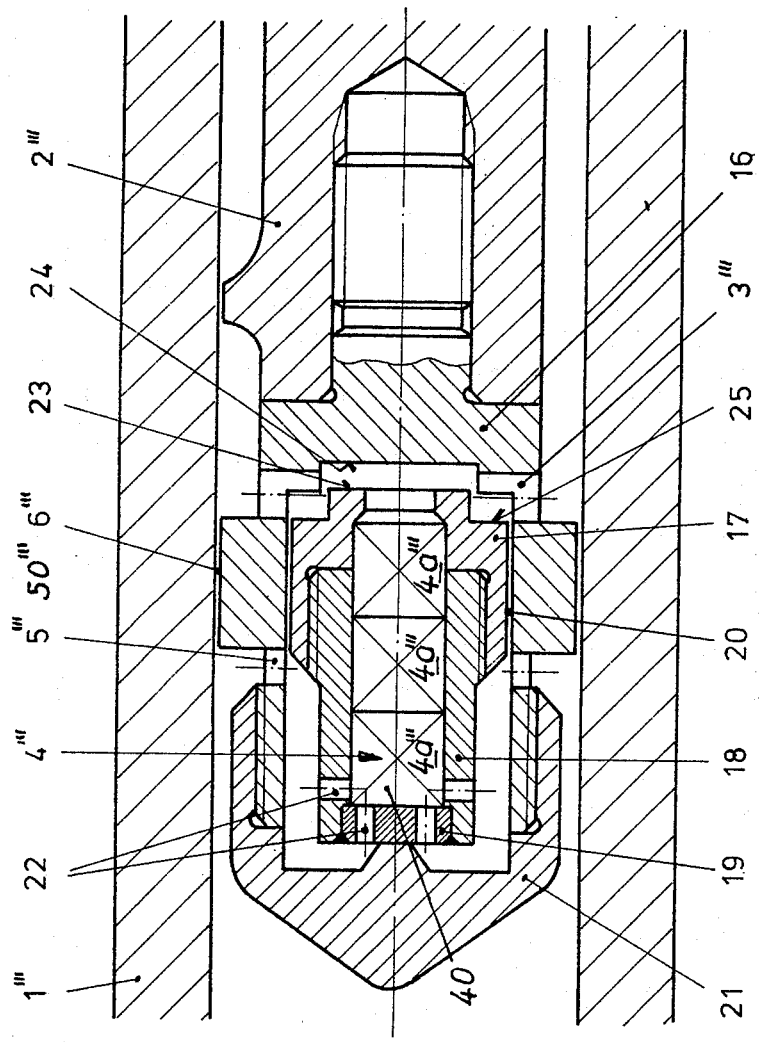

In the embodiment shown in FIG. 4, a plasticizing machine 50''' comprises a cylinder 1''' having a screw 2''' therein. Here again, the mixing device is combined with a nonreturn lock. The mass flows through radial openings 3''' into the interior of a support member 16. Separate annular sleeve members 17, 18 and 19 are arranged so as to define an interior bore 40''' defining a mixing passage having mixing elements 4a''' therein. During the metering phase, the mass flows through the mixing elements 4a''' and pushes with the annular sleeve members 17, 18 and 19 against the cap 21. Then the mass is discharged from the mixing device through the openings 22 and 5'''. The mass is directed so as to avoid dead spaces and thermal damaging of the mass in its passage. The individual sleeve members 17, 18 and 19 operate as a nonreturn lock and they are shown in their open position during the metering phase. During the injection, sleeve members 17, 18 and 19, along with the mixing elements 4a''', become displaced rearwardly so that the sealing surfaces 23 and 24 apply against each other. Thereby, a back flow of the mass is prevented. The nonreturn lock is opened again by the metering pressure force acting on an annular surface 25.

While specific embodiments of the invention have been shown and described in detail to illustrate the application of the principles of the invention, it will be understood that the invention may be embodied otherwise without departing from such principles.

What is claimed is:

1. In a plasticizer comprising a cylinder having a bore the improvement comprising a feed screw adapted to be rotatably supported within this bore, said feed screw having a forward end with a passage portion, an annular non-return locking ring disposed around said passage portion and defining a ceiling gap clearance therebetween, said screw having a cap portion disposed ahead of said passage portion, a bore extending through said passage portion defining a mixing passage for the material being fed, means in said mixing passage for causing the diversion and intermixing of the material passing therethrough, said screw having a continuous thread on its periphery for advancing material through the bore of the cylinder upon rotation of said screw, a first feed passage defined in said screw at the juncture of said cap portion and said locking ring, and a second feed passage defined alongside the opposite end of said locking ring and extending radially inwardly from the periphery of said screw to said mixing passage, said locking ring being slideable after initial feeding by said screw rotation to at least partially close off one of said first and second feed passages.

2. A plasticizer according to claim 1, wherein said screw includes a first portion having an end face with a threaded bore defined therein, said passage portion comprising a cylindrical member having an end threadably engaged in the end of said first portion.

3. A plasticizer according to claim 1, wherein said lock ring has respective end edges which are bevelled in respective opposite directions defining respective ceiling surfaces which overlie said first and second feed passages respectively in respect of axial end positions of said locking ring.

4. A plasticizer comprising a cylinder having a bore, a feed screw rotatably supported within said cylinder bore, a passage portion of said screw located adjacent the forward end thereof having a periphery spaced inwardly from the interior of said cylinder and defining a small clearance therewith sufficient to maintain a clean space therebetween, a bore extending through said passage portion defining a mixing passage for the material being fed, means in said mixing passage for causing the diversion and intermixing of the material passing therethrough, said screw being constructed with a continuous thread to advance material in said cylinder through the space between said screw and the interior of said cylinder during rotation of said screw and to move the material through said mixing passage, an upstream communicating passage extending from the periphery of said screw to said mixing passage adjacent one end of said mixing passage for the inflow of the material thereto and a downstream communicating passage extending from the periphery of said screw to said mixing passage adjacent the opposite end thereof for the outflow of the material therefrom; said passage portion including an axially slideable sleeve member having one end bounding said upstream communicating passage, said sleeve being displaced after the initial feeding of material to close off said communicating passage in the form of a nonreturn lock.

5. A plasticizer comprising a cylinder having a bore, a feed screw rotatably supported within said cylinder bore, a passage portion of said screw located adjacent the forward end thereof having a periphery spaced inwardly from the interior of said cylinder and defining a small clearance therewith sufficient to maintain a clean space therebetween, a bore extending through said passage portion defining a mixing passage for the material being fed, means in said mixing passage for causing the diversion and intermixing of the material passing therethrough, said screw being constructed with a continuous thread to advance material in said cylinder through the space between said screw and the interior of said cylinder during rotation of said screw and to move the material through said mixing passage, an upstream communicating passage extending from the periphery of said screw to said mixing passage adjacent one end of said mixing passage for the inflow of the material thereto and a downstream communicating passage extending from the periphery of said screw to said mixing passage adjacent the opposite end thereof for the outflow of the material therefrom; a hollow supporting member having a front end with an opening, a cap threaded on said said hollow supporting member and closing the opening on the front end of said hollow supporting member, a locking ring slidable on said hollow supporting member, said upstream communicating passage being bounded by an edge of said locking ring, the opposite end of said locking ring being capable of abutting against said cap, said locking ring being displaceable to close said upstream communicating passage.

* * * * *